(12) United States Patent
Sakuyama et al.

(10) Patent No.: US 7,433,523 B2
(45) Date of Patent: Oct. 7, 2008

(54) IMAGE BROWSING DEVICE ACQUIRING CODED DATA FOR SAVING A DISPLAYED IMAGE FROM IMAGE DATA SOURCE

(75) Inventors: Hiroyuki Sakuyama, Tokyo (JP); Shin Aoki, Kanagawa (JP); Takao Inoue, Kanagawa (JP); Taku Kodama, Kanagawa (JP); Ikuko Yamashiro, Kanagawa (JP); Takanori Yano, Kanagawa (JP); Takashi Maki, Kanagawa (JP); Akira Takahashi, Kanagawa (JP); Keiichi Ikebe, Kanagawa (JP); Takeshi Koyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 891 days.

(21) Appl. No.: 10/716,969

(22) Filed: Nov. 18, 2003

(65) Prior Publication Data

US 2004/0130570 A1 Jul. 8, 2004

(30) Foreign Application Priority Data

Nov. 18, 2002 (JP) ............................. 2002-334150

(51) Int. Cl.
*G06K 9/36* (2006.01)
*G06F 3/00* (2006.01)
(52) U.S. Cl. ...................... 382/233; 382/305; 715/738
(58) Field of Classification Search ................ 382/232, 382/233, 240, 305; 715/738; 707/101; 375/240.19
See application file for complete search history.

(56) References Cited

U.S. PATENT DOCUMENTS 6,347,157 B2 * 2/2002 Chui .......................... 382/240

2002/0154823 A1 * 10/2002 Okada ....................... 382/233

FOREIGN PATENT DOCUMENTS

| JP | 2000-078395 | 3/2000 |
|---|---|---|
| JP | 2001-345961 | 12/2001 |
| JP | 2002-170113 | 6/2002 |
| JP | 2002-176561 | 6/2002 |

OTHER PUBLICATIONS

Japanese Office Action for JP Appln No. JP 2002-334150, mailed Jan. 31, 2007 (1 page).
Japanese Office Action for JP Appln No. JP 2002-334150, mailed Mar. 5, 2007 (1 page).
Japanese Office Action for JP Appln No. JP 2002-334150, mailed Dec. 5, 2006 (1 page).
Nomizu, Yasuyuki, "Next-Generation Image Coding Method JPEG2000," Triceps Inc., Feb. 13, 2001.

* cited by examiner

*Primary Examiner*—Duy M Dang
(74) *Attorney, Agent, or Firm*—Blakely, Sokoloff, Taylor & Zafman LLP

(57) ABSTRACT

Upon browsing an image stored in an image data source, coded data used for display of the image is acquired from the image data source. The acquired coded data used for the display is decoded/extended, and the image is displayed on a display unit. A user inputs a direction for saving the image displayed on the display unit via a user interface unit. Coded data for the saving of the image directed by the user is acquired from the image data source, such as by additionally acquiring coded data equivalent to a difference between the coded data for the saving and the coded data used for the display from the image data source, and synthesizing the coded data for the saving from the additionally acquired coded data and the coded data used for the display. The acquired coded data for the saving is saved in a storage unit.

18 Claims, 17 Drawing Sheets

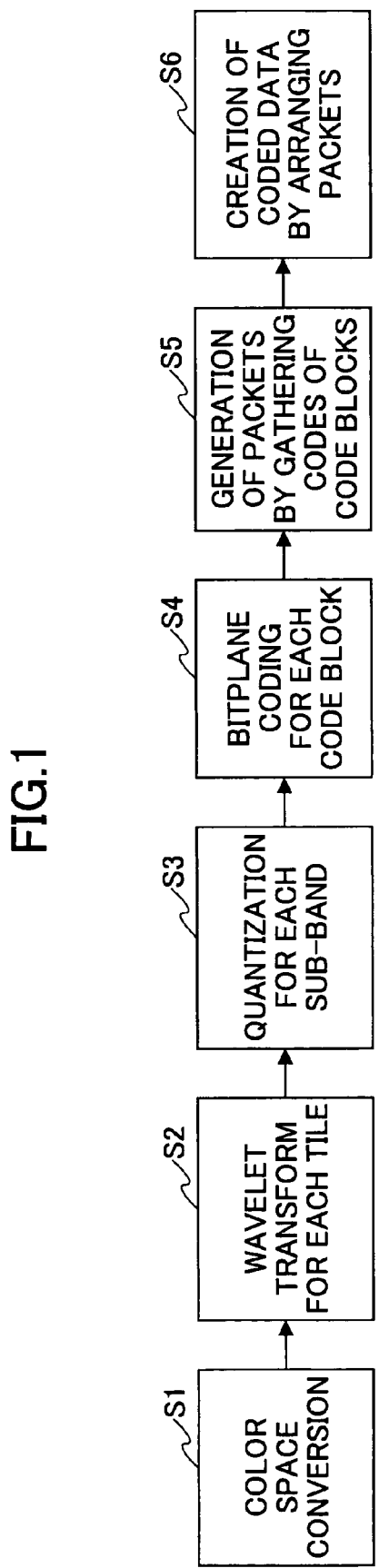

DECOMPOSITION LEVEL 0

DECOMPOSITION LEVEL 1

DECOMPOSITION LEVEL 2

DECOMPOSITION LEVEL 3

FIG.6

| | | NAME | CODE | MAIN HEADER | TILE-PART HEADER |
|---|---|---|---|---|---|
| DELIMITING MARKER SEGMENTS | START OF CODESTREAM<br>START OF TILE-PART<br>START OF DATA<br>END OF CODESTREAM | SOC<br>SOT<br>SOD<br>EOC | 0xff4f<br>0xff90<br>0xff93<br>0xffd9 | REQUISITE<br>NOT ALLOWED<br>NOT ALLOWED<br>NOT ALLOWED | NOT ALLOWED<br>REQUISITE<br>START MARKER<br>NOT ALLOWED |
| FIXED INFORMATION MARKER SEGMENTS | IMAGE AND TILE SIZE | SIZ | 0xff51 | REQUISITE | NOT ALLOWED |
| FUNCTIONAL MARKER SEGMENTS | CODING STYLE DEFAULT<br>CODING STYLE COMPONENT<br>REGION-OF INTEREST<br>QUANTIZATION DEFAULT<br>QUANTIZATION COMPONENT<br>PROGRESSION ORDER CHANGE | COD<br>COC<br>RGN<br>QCD<br>QCC<br>POC | 0xff52<br>0xff53<br>0xff5e<br>0xff5c<br>0xff5d<br>0xff5f | REQUISITE<br>OPTIONAL<br>OPTIONAL<br>REQUISITE<br>OPTIONAL<br>OPTIONAL | OPTIONAL<br>OPTIONAL<br>OPTIONAL<br>OPTIONAL<br>OPTIONAL<br>OPTIONAL |
| POINTER MARKER SEGMENTS | TILE-PART LENGTH, MAIN HEADER<br>PACKET LENGTH, MAIN HEADER<br>PACKET LENGTH, TILE-PART HEADER<br>PACKED PACKET HEADERS, MAIN HEADER<br>PACKED PACKET HEADERS, TILE-PART HEADER | TLM<br>PLM<br>PLT<br>PPM<br>PPT | 0xff55<br>0xff57<br>0xff58<br>0xff60<br>0xff61 | OPTIONAL<br>OPTIONAL<br>NOT ALLOWED<br>OPTIONAL<br>NOT ALLOWED | NOT ALLOWED<br>NOT ALLOWED<br>OPTIONAL<br>NOT ALLOWED<br>OPTIONAL |
| IN BIT STREAM MARKER SEGMENTS | START OF PACKET<br>END OF PACKET HEADER | SOP<br>EPH | 0xff91<br>0xff92 | NOT ALLOWED<br>NOT ALLOWED | OPTIONAL<br>OPTIONAL |
| INFORMATION MARKER SEGMENTS | COMPONENT REGISTRATION<br>COMMENT | CRG<br>COM | 0xff63<br>0xff64 | OPTIONAL<br>OPTIONAL | OPTIONAL<br>OPTIONAL |

FIG.7

| SOT | Lsot | Isot | Psot | TPsot | TNsot |

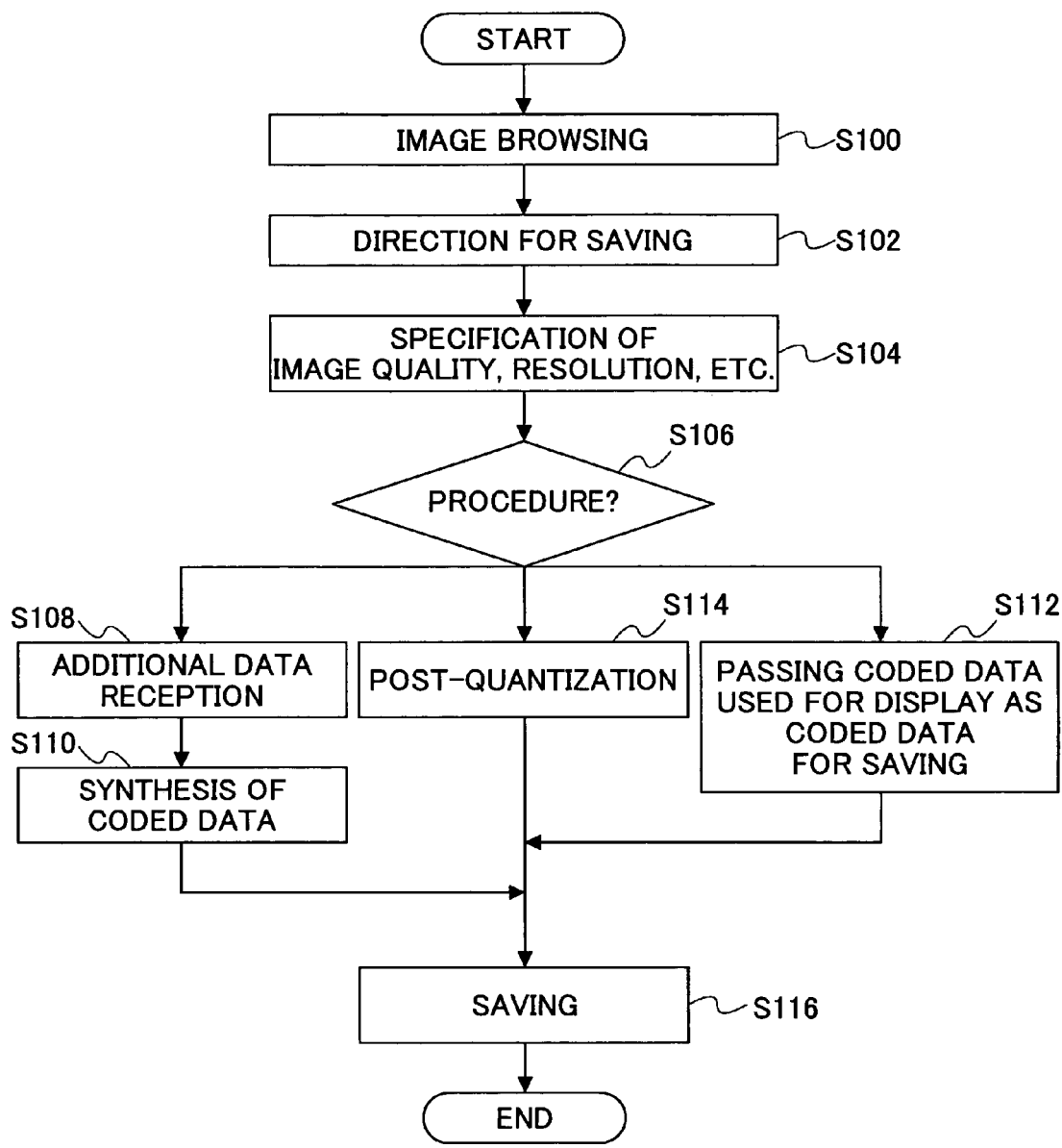

FIG.19

|  |  |
|---|---|
| IMAGE QUALITY | ◉HIGHEST IMAGE QUALITY<br>○PRESENT IMAGE QUALITY<br>○ECONOMY IMAGE QUALITY |
| RESOLUTION | ◉HIGHEST RESOLUTION<br>○PRESENT RESOLUTION<br>○ECONOMY RESOLUTION |
| COMPONENT | ○ALL (BRIGHTNESS, COLOR DIFFERENCE)<br>◉PRESENT COMPONENT<br>○BRIGHTNESS ONLY<br>○COLOR DIFFERENCE BLUE ONLY<br>○COLOR DIFFERENCE RED ONLY |
| AREA | ○ALL AREAS<br>○PRESENT AREAS<br>◉CENTER ONLY |
| FRAME | ◉ALL FRAMES<br>○NUMBER OF PRESENT FRAMES<br>○FRAME REDUCTION |
| END OF SPECIFICATION |  |

300

US 7,433,523 B2

IMAGE BROWSING DEVICE ACQUIRING CODED DATA FOR SAVING A DISPLAYED IMAGE FROM IMAGE DATA SOURCE

The present application claims priority to the corresponding Japanese Application No. 2002-334150, filed on Nov. 18, 2002, the entire contents of which are hereby incorporated by reference.

BACKGROUND OF THE INVENTION

1. Field of the Invention

The present invention generally relates to an image browsing device for browsing an image stored in an image data source, and more particularly, to an image browsing device having a function of saving a browsed image.

2. Description of the Related Art

An image browsing device for browsing an image stored in an image data source, e.g., a server on a network, such as such as a LAN or the Internet, is often realized by software called a browser or a viewer on a computer, such as a personal computer. Generally, such software enables an image on display to be saved with an arbitrary file name.

For example, in a case of a representative WWW browser, Internet Explorer (registered trademark), operating on Microsoft Windows (registered trademark), which is a representative operating system, upon saving an image loaded from a WWW server and browsed, the image can be saved under an arbitrary file name by putting a mouse pointer on the image, clicking a right mouse button to display a context menu, and selecting "save as (save under a new file name)" in the menu. However, the saved image data is image data per se (coded data, such as of JPEG) loaded from the WWW server and displayed.

Besides, there are varieties of software that enable a displayed image to be recompressed and saved. For example, in a case of Adobe Photoshop (registered trademark), which is a representative retouching software, a displayed image (an image acquired from an image data source, or an image processed from the acquired image) can be recompressed and saved under an arbitrary file name by selecting "save as (save under a new file name)" in the menu.

Software such as explained above is commonly known, and many documents thereabout are distributed.

Commonly, an image is stored or transmitted in a compressed form. As methods for compressing an image, JPEG is widely used for compressing a static image, and MPEG is widely used for compressing a dynamic image. However, as compression methods replacing the above-mentioned methods, JPEG2000 (ISO/IEC FCD 15444-1) and Motion-JPEG2000 (ISO/IEC FCD 15444-3) draw attention (for example, disclosed in nonpatent document 1 authored by Yasuyuki Nomizu, "Next-Generation Image Coding Method JPEG2000", Triceps Inc., Feb. 13, 2001). Besides, Motion-JPEG2000 treats a dynamic image by regarding each of successive static images as a frame, and each frame conforms to JPEG2000.

For browsing an image by using a common display, not so high an image quality and resolution are required. In loading and browsing an image from a WWW server, etc., on the Internet, there are restrictions on transmission speed. An image of high quality and high resolution requires a relatively long time to be displayed. For these reasons, an image of relatively low quality and resolution is usually loaded and browsed. On the other hand, an image is saved for various purposes. For purposes such as printing, or zooming on a high-definition big screen display, an image of higher quality and higher resolution is desired to be saved.

However, as mentioned above, with a conventional browser or viewer, since displayed image data per se is saved, a quality and a resolution thereof become unsatisfactory, depending on purposes of saving.

If an image of sufficient quality and resolution is loaded and browsed, an image of a quality and a resolution that suit the printing purpose can be saved; however, this largely increases a time for loading the image and a time for displaying the image for browsing, thereby decreasing an image browsing speed. Not all of browsed images are necessarily to be saved, but only a required image may be saved amongst the browsed images; therefore, such decrease in the image browsing speed is not preferable.

Besides, the above-mentioned retouching software and so forth cannot save an image of higher quality and higher resolution than a displayed image.

SUMMARY OF THE INVENTION

An image browsing device acquiring coded data for saving a displayed image from an image data source is described. In one embodiment, the image browsing device that browses an image stored in an image data source, comprises a coded-data-for-display acquisition unit to acquire coded data used for display of the image from the image data source, a unit to decode/extend the acquired coded data used for the display, and display the image on a display unit, a user interface unit to provide a user interface for a user to input a direction for saving the image displayed on the display unit, a coded-data-for-saving acquisition unit to acquire coded data for the saving of the image directed by the user from the image data source, and a saving unit to save the acquired coded data for the saving in a storage unit.

BRIEF DESCRIPTION OF THE DRAWINGS

FIG. 1 is a block diagram for illustrating an algorithm of JPEG2000;

FIG. 6 is a diagram showing a table of markers and marker segments shown in FIG. 3 to FIG. 5B;

FIG. 7 is a diagram showing a structure of an SOT marker segment;

FIG. 18 is a flowchart for illustrating an operation of the image browsing device according to the present invention;

FIG. 19 is a diagram showing an example of a menu for specifying an image quality, a resolution and so forth;

DETAILED DESCRIPTION OF THE PREFERRED EMBODIMENTS

Figure 2A:
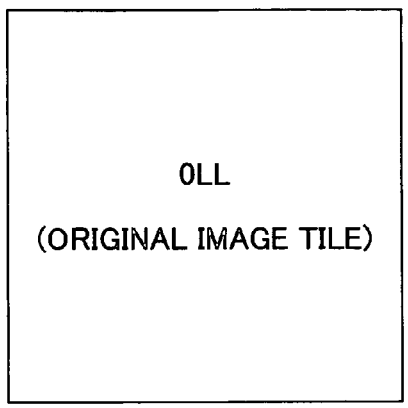
FIG. 2A to FIG. 2D are diagrams for illustrating a two-dimensional wavelet transform.

An embodiment of the present invention comprises an improved and useful image browsing device, in which the above-mentioned problems are eliminated.

A more specific embodiment of the present invention comprises a device and a method for saving a required image amongst browsed images, with an image quality, a resolution and so forth, which suit a purpose of saving, without decreasing an image browsing speed.

In order to achieve the above-mentioned embodiments, one embodiment of the present invention comprises an image browsing device that browses an image stored in an image data source. The image browsing device includes a coded-data-for-display acquisition unit to acquire coded data used for display of the image from the image data source, a display processing unit to decode/extend the acquired coded data used for the display, and display the image on a display unit, a user interface unit to provide a user interface for a user to input a direction for saving the image displayed on the display unit, a coded-data-for-saving acquisition unit to acquire coded data for the saving of the image directed by the user from the image data source, and a saving unit to save the acquired coded data for the saving in a storage unit.

According to one embodiment of the present invention, by directing a saving of a required image amongst browsed images, coded data for the saving which has an image quality, a resolution and so forth that suit a purpose of the saving can be acquired and saved. Even upon enabling an image of a higher quality and a higher resolution to be saved for purposes such as printing, the amount of coded data used for display to browse the image does not need to be increased; therefore the image can be browsed at a high-speed.

Additionally, in the image browsing device according to one embodiment of the present invention, the coded-data-for-saving acquisition unit additionally may acquire coded data equivalent to a difference between the coded data for the saving and the coded data used for the display from the image data source, and may synthesize the coded data for the saving from the additionally acquired coded data and the coded data used for the display.

According to one embodiment of the present invention, when an amount of codes of coded data for saving is larger than coded data for display, only coded data are additionally acquired that are equivalent to the difference between the coded data for saving and the coded data for display from the image data source can shorten a transmission time of the coded data from the image database than acquiring the coded data for saving as a whole from the image data source.

Additionally, in the image browsing device according to one embodiment of the present invention, the user interface unit may present the user with a menu regarding at least one of elements of an image quality, a resolution, a number of components, an area and a number of frames of the image when the saving of the image displayed on the display unit is directed by the user, and may supply specification information corresponding to an item selected on the menu by the user, and the coded-data-for-saving acquisition unit may acquire the coded data for the saving according to the supplied specification information.

According to one embodiment of the present invention, the user can easily specify an image quality, a resolution and so forth, which suit a purpose of saving the image on the menu presented by the user interface unit.

Additionally, in the image browsing device according to one embodiment of the present invention, the user interface unit may present the user with boundary lines of divided areas of the image directed to be saved.

According to one embodiment of the present invention, boundary lines of divided areas of the image are presented such as by being overlapped on the displayed image. Therefore, the user can grasp how the image areas are divided, and can easily specify the "areas (tiles)" of the image to be saved.

Other embodiments, features and advantages of the present invention will become more apparent from the following detailed description when read in conjunction with the accompanying drawings.

A description will now be given, with reference to the drawings, of embodiments according to the present invention.

In the following embodiments, coded data of a static image of JPEG2000 or coded data of a dynamic image of Motion-JPEG2000 is subjected to processing. Motion-JPEG2000 treats a dynamic image by regarding each of successive static images as a frame, in which each frame is compressed independently from preceding and following frames, and coded data of each frame conforms to JPEG2000.

JPEG2000 is detailed, for example, in the above-mentioned nonpatent document 1; however, in order to facilitate an understanding of the following embodiments, JPEG2000 will be outlined hereinbelow.

FIG. 1 is a simplified block diagram for illustrating an algorithm of JPEG2000. Image data (e.g., image data of each frame when treating a dynamic image) to be compressed is divided into not overlapping rectangular areas called tiles (tile images) for each component, and is processed on an individual tile basis for each component. However, the tile can have a same size as a size of the image, whereby the tile division is not performed.

The tile image is subjected to a color space conversion from RGB data or CMY data to YCrCb data for the purpose of improving a compression ratio (step S1). This color space conversion may be omitted.

A two-dimensional wavelet transform (a discrete wavelet transform: DWT) is performed to each tile image of each component after the color space conversion (step S2).

Figure 2B:
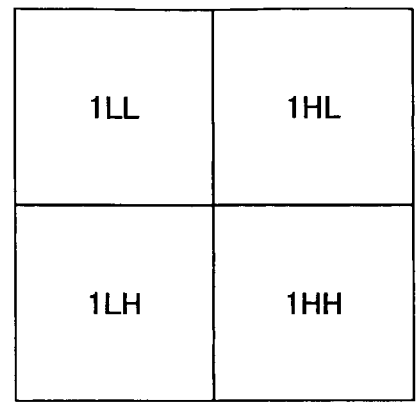
Figure 2C:
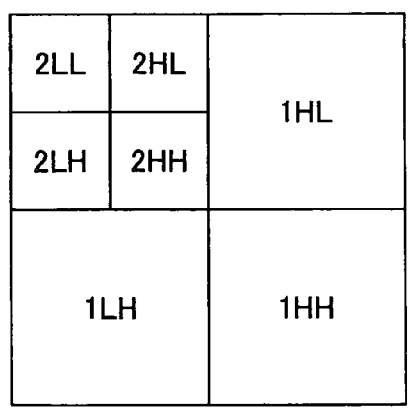
Figure 2D:
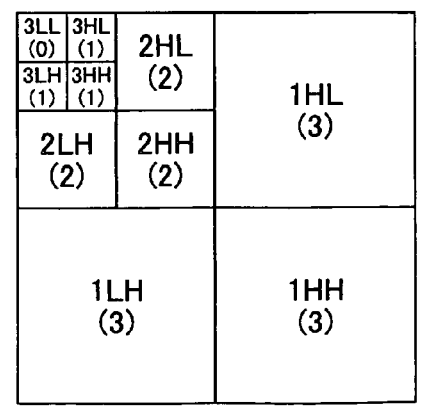

FIG. 2A to FIG. 2D are diagrams of the wavelet transform in a case where a number of decomposition levels are three. A tile image shown in FIG. 2A (decomposition level 0) is subjected to the two-dimensional wavelet transform so as to be divided into sub-bands of 1LL, 1HL, 1LH and 1HH as shown in FIG. 2B. By applying the two-dimensional wavelet transform to a coefficient of the 1LL sub-band, the 1LL sub-band is divided into sub-bands of 2LL, 2HL, 2LH and 2HH as shown in FIG. 2C. By applying the two-dimensional wavelet transform to a coefficient of the 2LL sub-band, the 2LL sub-band is divided into sub-bands of 3LL, 3HL, 3LH and 3HH, as shown in FIG. 2D. As for a relationship between the decomposition level and a resolution level, a parenthesized number in each of the sub-bands shown in FIG. 2D indicates the resolution level of the sub-band.

Wavelet coefficients obtained by the above-described recursive division (octave division) of the low-frequency components (the LL sub-band coefficients) are quantized for each of the sub-bands (step S3). In JPEG2000, both a lossless (reversible) compression and a lossy (irreversible) compression are possible, and in the lossless compression, a quantization step width is always one, and quantization is not performed at this stage.

Each of the sub-band coefficients after the quantization is converted into entropy code (step S4). A coding method referred to as EBCOT (Embedded Block Coding with Optimized Truncation) comprising a block division, a coefficient modeling and a binary arithmetic coding is used for the above-mentioned entropy coding, in which a bit plane of each of the sub-band coefficients after the quantization is coded from a higher-order plane toward a lower-order plane for each block referred to as code block (more exactly, one bit plane is divided into three sub bit plains and coded).

Final two steps S5 and S6 are code formation processes. First, in step S5, the codes of the code blocks that are generated in step S4 are gathered into packets. In the following step S6, the packets generated in step S5 are arranged according to a progression order, and include necessary tag information so that coded data in a predetermined format is created. Regarding the code sequencing, JPEG2000 defines five types of progression orders depending on combinations of a resolution level, a position (a precinct), a layer, and a component (color component).

Figure 3:
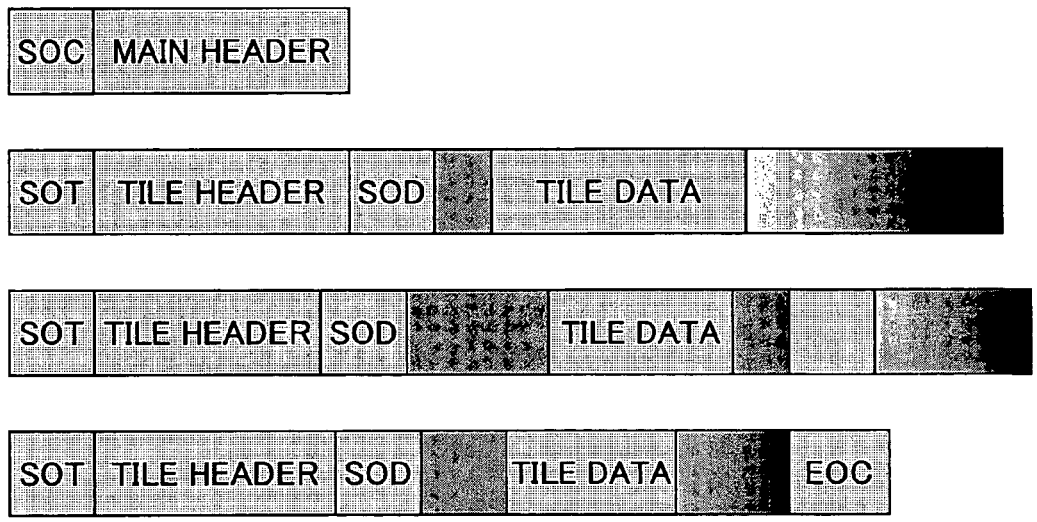
FIG. 3 is a diagram for illustrating a format of coded data of JPEG2000.

FIG. 3 shows the format of the coded data of JPEG2000 created as above. As shown in FIG. 3, the coded data starts with a tag referred to as SOC marker which indicates the start of the coded data, followed by tag information referred to as main header describing coding parameters, quantization parameters and so forth, and followed by the coded data of each of the tiles. The coded data of each of the tiles starts with a tag referred to as SOT marker, and comprises tag information referred to as tile header, a tag referred to as SOD marker, and tile data containing a code stream of each of the tiles. After the final tile data, a tag referred to as EOC marker indicating an end of the coded data of JPEG2000 is located.

A description will be given of an outline of the tags and the tag information added to the coded data of JPEG2000.

Figure 4:
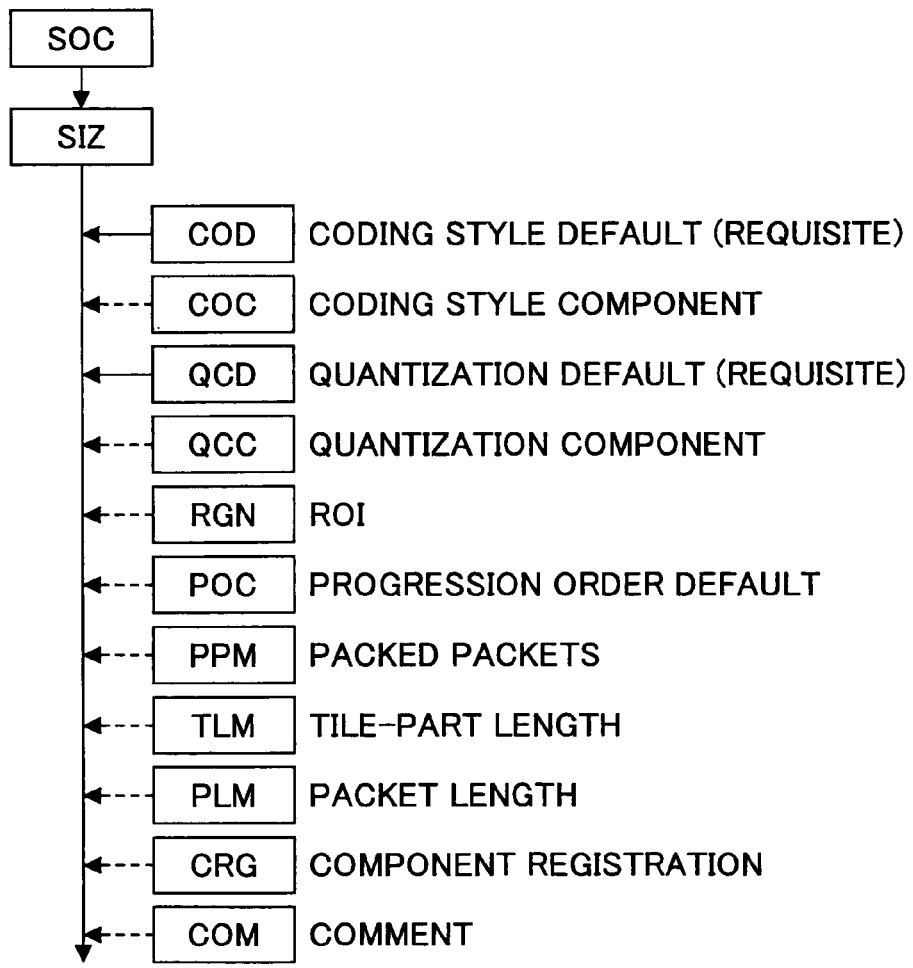
FIG. 4 is a diagram showing a structure of a main header shown in FIG. 3.

FIG. 4 shows a structure of the main header. Although each of marker segments of SIZ, COD, and QCD is requisite, other marker segments are optional.

Figure 5A:
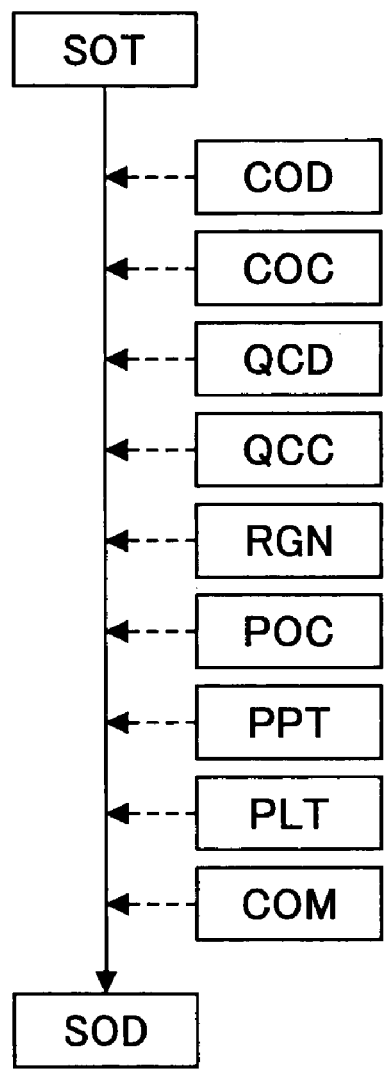
FIG. 5A and FIG. 5B are diagrams showing structures of tile headers shown in FIG. 3.
Figure 5B:
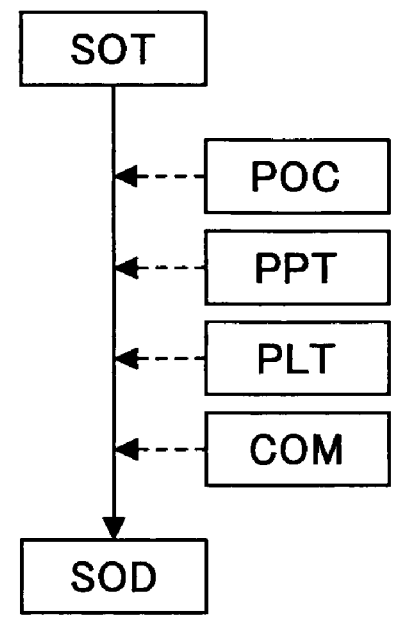

Each of FIG. 5A and FIG. 5B shows a structure of the tile header. FIG. 5A shows an example of the header added to a head of the tile data. FIG. 5B shows an example of the header added to a head of each of divided tile sub-streams when the tile is divided into the tile sub-streams. In the tile header, there is no requisite marker segment, and all of marker segments are optional.

Figure 7:
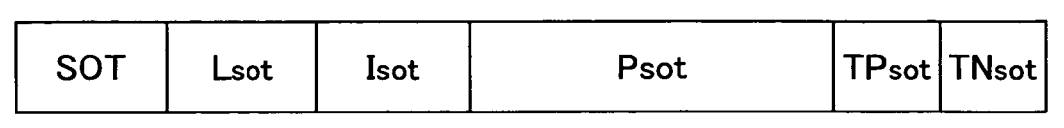
Figure 8:
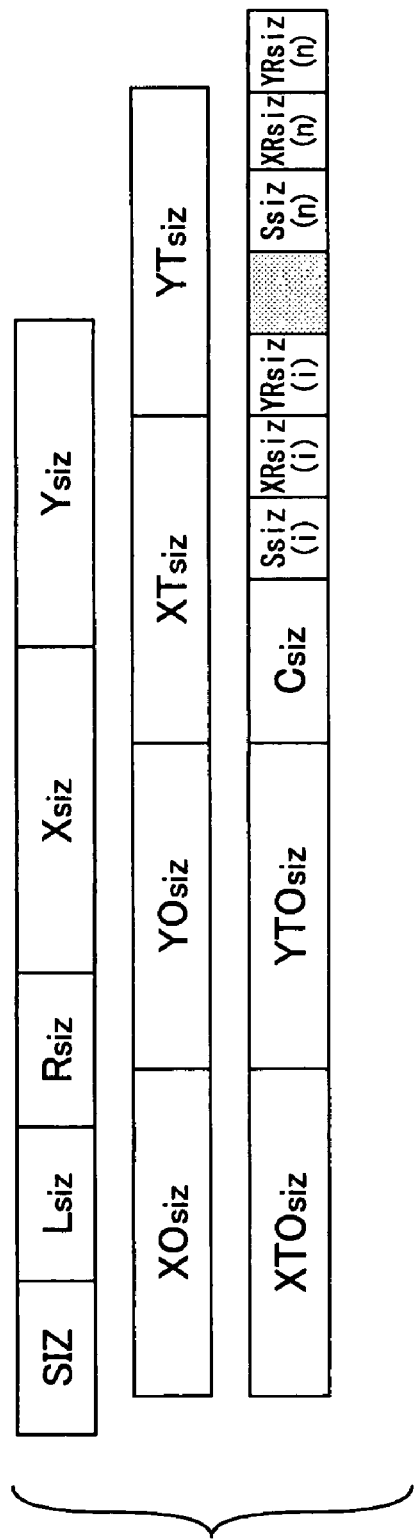
FIG. 8 is a diagram showing a structure of an SIZ marker segment.
Figure 9:
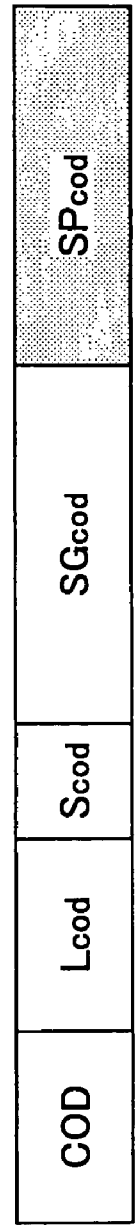
FIG. 9 is a diagram showing a structure of a COD marker segment.
Figure 10:
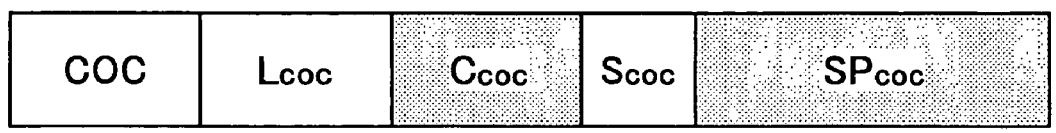
FIG. 10 is a diagram showing a structure of a COC marker segment.
Figure 11:
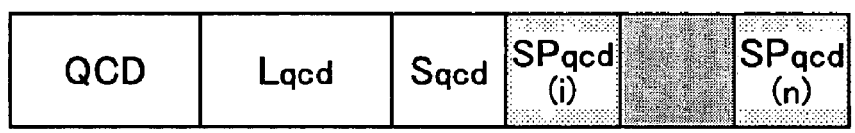
FIG. 11 is a diagram showing a structure of a QCD marker segment.
Figure 12:
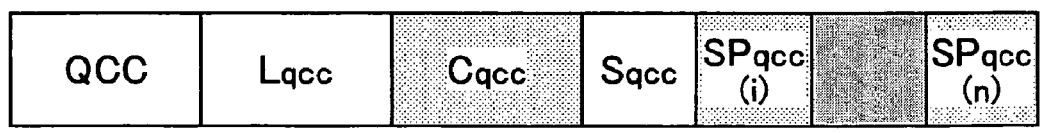
FIG. 12 is a diagram showing a structure of a QCC marker segment.

FIG. 6 shows a table of markers and marker segments. FIG. 7 shows a structure of an SOT marker segment. FIG. 8 shows a structure of an SIZ marker segment. FIG. 9 shows a structure of a COD marker segment. FIG. 10 shows a structure of a COC marker segment. FIG. 11 shows a structure of a QCD marker segment. FIG. 12 shows a structure of a QCC marker segment.

Here, a description will be given of the precinct, the code block, the packet and the layer. There is a relation in size: image>=tile>=sub-band>=precinct>=code block.

Figure 13:
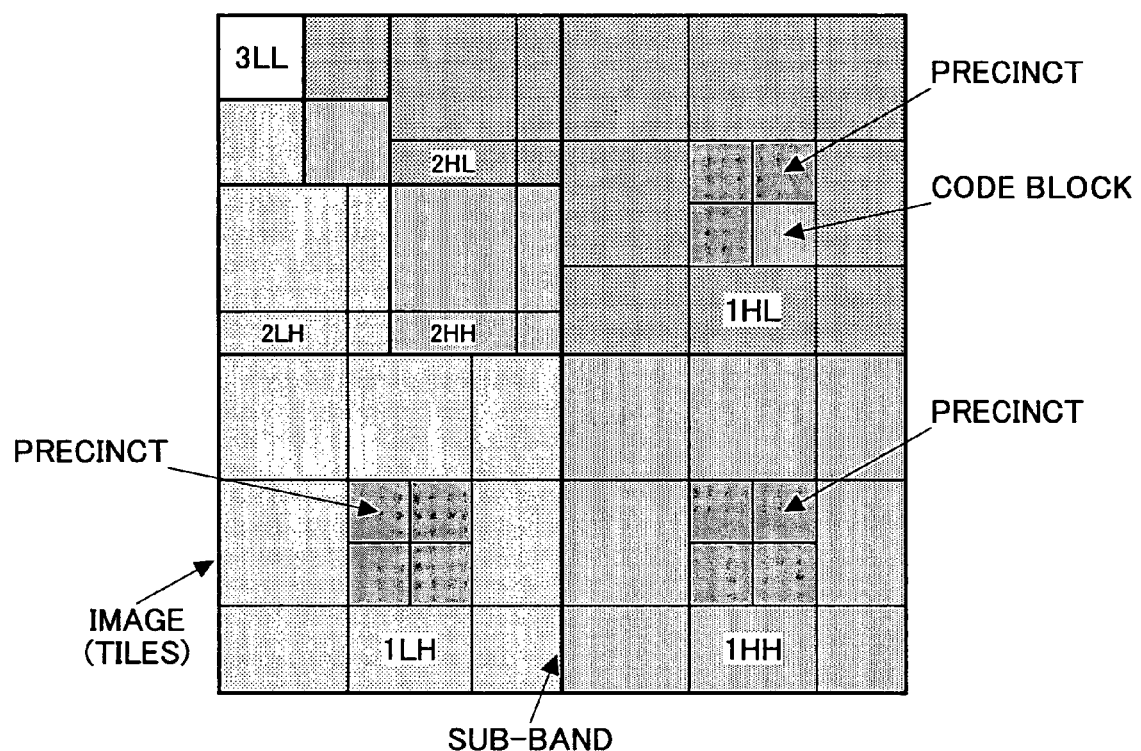
FIG. 13 is a diagram for illustrating a precinct and code blocks.

The precinct is a rectangular area in the sub-bands, and a group of three areas located at spatially identical positions in the HL, LH and HH sub-bands of the same decomposition level is treated as one precinct. However, in the LL sub-band, one area is treated as one precinct. A size of a precinct can be made into a same size as a sub-band. Besides, each of rectangular areas divided from a precinct is a code block. FIG. 13 shows one precinct and code blocks in the sub-bands of decomposition level 1. As shown in FIG. 13, a group of three areas (indicated as PRECINCT) located at spatially identical positions is treated as one precinct.

Parts of codes (e.g., codes of three bit planes from a highest-order bit plane to a third bit plane) in all of code blocks included in a precinct are extracted and gathered into respective packets. A packet is allowed to have empty codes. The codes of the code blocks are gathered into the packets, and the packets are arranged according to a desired progression order so as to form coded data. The SOD marker and the following units regarding each of the tiles shown in FIG. 3 is a set of packets.

Packets of all of precincts (i.e., all code blocks, all sub-bands) are gathered into units of code of the whole image area (e.g., codes of three bit planes from a highest-order bit plane to a third bit plane of wavelet coefficients of the whole image area) that are layers. Therefore, as a number of layers decoded upon extension becomes large, a quality of a reproduced image becomes higher. That is, the layer can be considered to be a unit of image quality. All layers are gathered into the code of all of bit planes of the whole image area.

Besides, the packet has a structure in which a packet header is added to packet data (code) that is a main unit. The packet header includes information, such as a length of the packet data, a number of code paths, and a number of 0-bit planes.

JPEG2000 has many features, one of which is that an amount of codes can be adjusted in a coded state by abandonment (post-quantization) of the codes of coded data. Besides, by performing an operation contrary to the post-quantization, i.e., by synthesizing the coded data after the post-quantization with coded data obtained by collecting all or a part of the codes abandoned by the post-quantization, the coded data prior to the post-quantization, or coded data having a larger amount, can also be created with ease.

A description will be given of the above-mentioned post-quantization in relation to the progression order. JPEG2000 defines five progression orders of LRCP, RLCP, RPCL, PCRL and CPRL. L represents "layer", R represents "resolution level", C represents "component", and P represents "precinct (position)".

In a case of the LRCP progression, handling of packets (arranging packets upon coding; interpreting packets upon decoding) is performed according to a FOR loop nested in order of L, R, C and P as follows:

```
for (layer) {
    for (resolution level) {
        for (component) {
            for (precinct) {
                arrange packets: upon coding
                    interpret packets: upon decoding
            }
        }
    }
}
```

Figure 14:
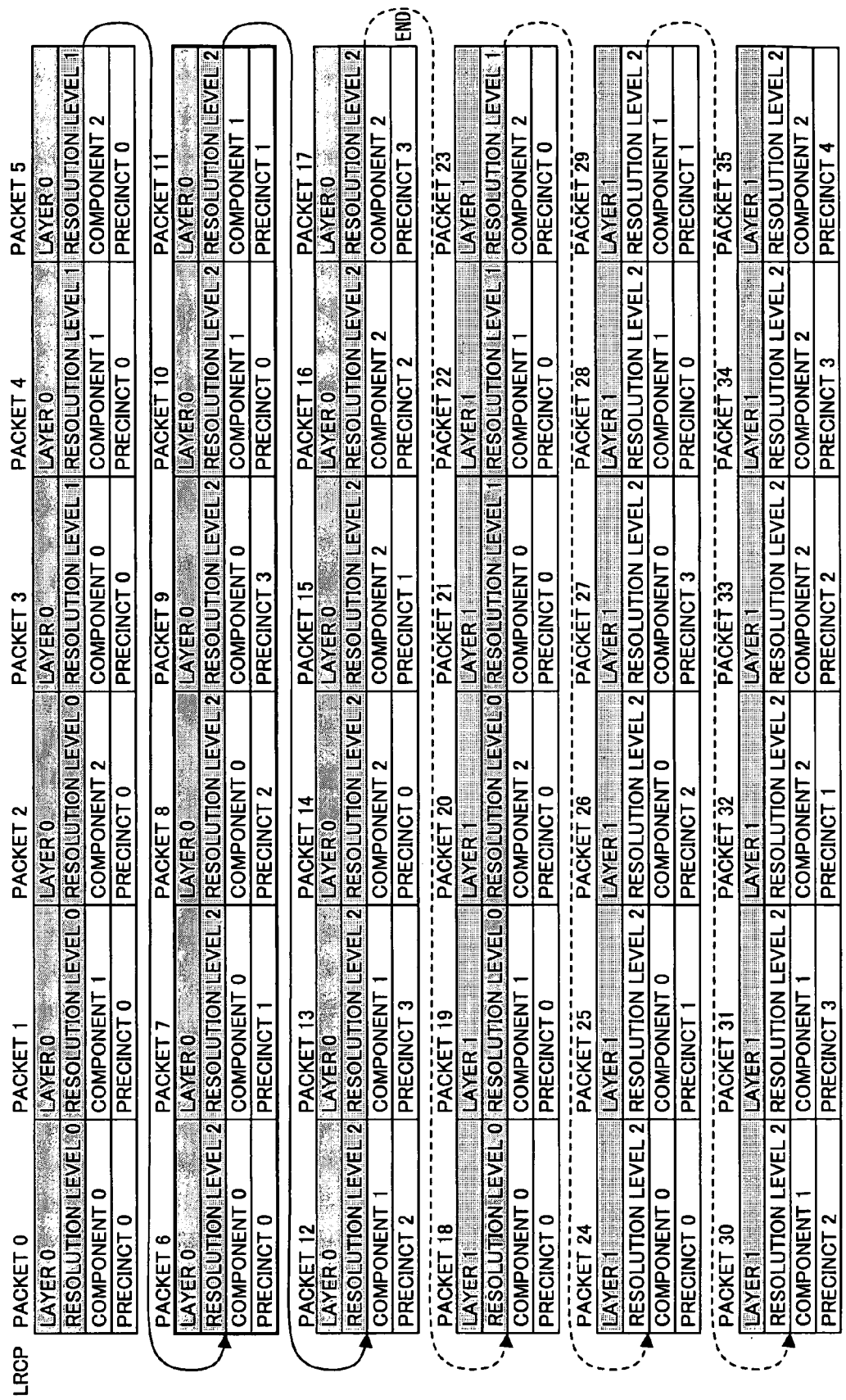
FIG. 14 is a diagram for illustrating an order of interpreting packets and a post-quantization performed to coded data of LRCP progression.

In a specific example, 36 packets in a case of the image size being 100×100 pixels (with no tile division), and the number of layers being 2, the number of resolution levels being 3 (levels 0-2), the number of components being 3, and the precinct size being 32×32 are interpreted in an order as shown in FIG. 14. In this example, when performing a post-quantization to coded data which ends a decode/extension operation at a stage of "END" shown in FIG. 14, packets after the "END" are abandoned, the EOC marker is added to the end, and the number of layers described in SGcod of the COD marker segment (FIG. 9) is rewritten to a value smaller by 1. More generally, in a post-quantization abandoning codes of n lower-order layers, the number of layers described in SGcod is reduced by n. Besides, upon synthesizing the coded data after the post-quantization performed in layer units with coded data composed of all or a part of the codes abandoned by the post-quantization, the COD marker segment is rewritten in a manner contrary to the post-quantization.

In a case of the RLCP progression, handling of packets is performed according to the following order:

```
for (resolution level) {
    for (layer) {
        for (component) {
            for (precinct) {
                arrange packets: upon coding
                interpret packets: upon decoding
            }
        }
    }
}
```

Figure 15:
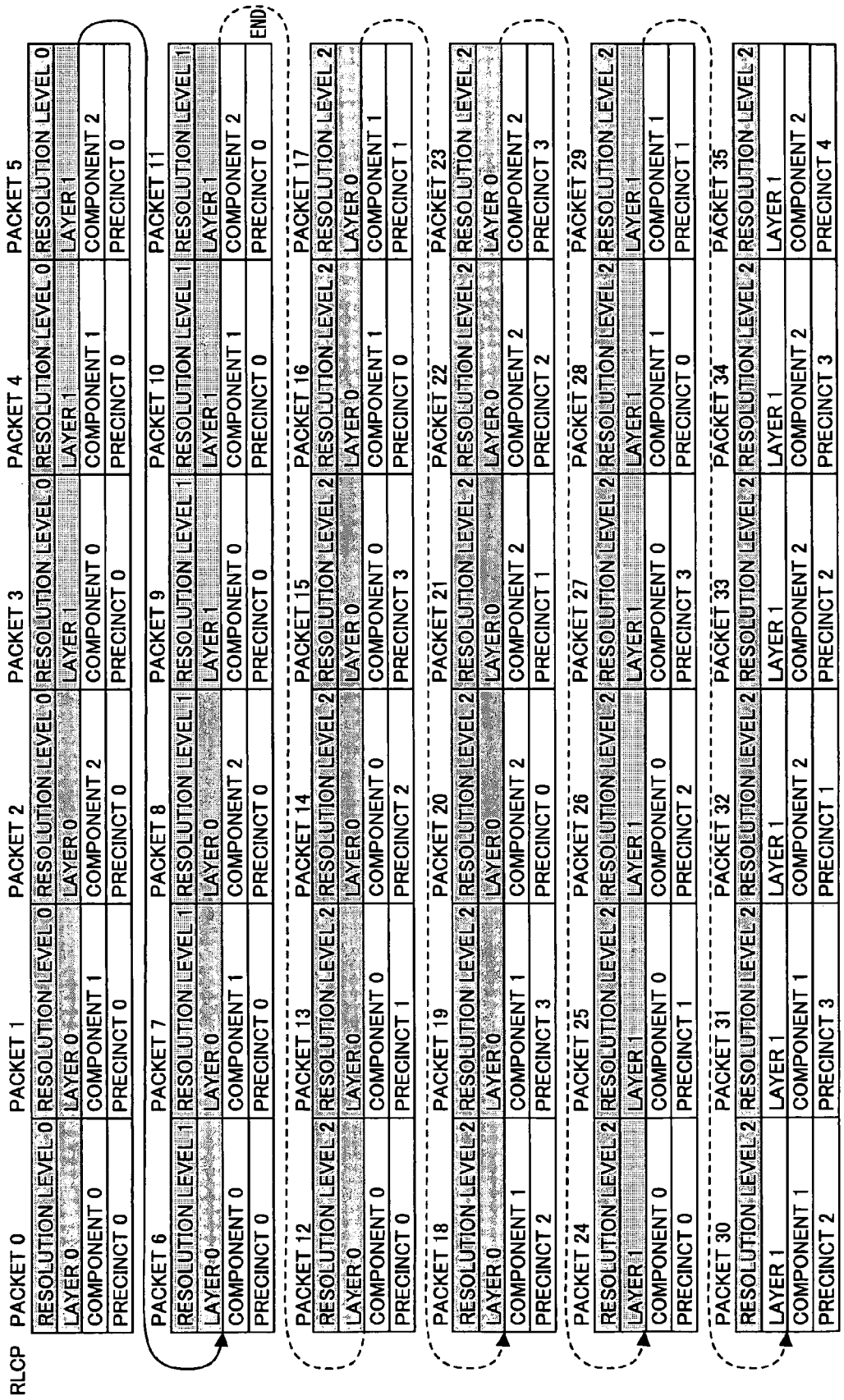
FIG. 15 is a diagram for illustrating an order of interpreting packets and a post-quantization performed to coded data of RLCP progression.

In a specific example, 36 packets in a case of the image size being 100×100 pixels (with no tile division), and the number of layers being 2, the number of resolution levels being 3 (levels 0-2), the number of components being 3, and the precinct size being 32×32 are interpreted in an order as shown in FIG. 15. In this example, when performing a post-quantization to coded data where the number of resolution levels is 2, i.e., when performing a post-quantization to coded data which ends a decode/extension operation at a stage of "END" shown in FIG. 15, packets after the "END" are abandoned, the EOC marker is added to the end, and necessary marker segments are rewritten. A description will be given of this rewriting of marker segments.

In a post-quantization reducing the number of resolution levels of coded data of the RLCP progression (or RPCL progression) by n, Xsiz, Ysiz, XTsiz and YTsiz of the SIZ marker segment (FIG. 8) are rewritten to a value of $\frac{1}{2}$^n of an original value (2^n means an n-th power of 2). The number of decompositions described in SPcod of the COD marker segment (FIG. 9) is rewritten to a value reduced by n. Besides, an entry of last n bytes of the precinct size of SPcod is deleted (this rewriting is unnecessary when the precinct size equals a maxim precinct of the sub-band size). A value of Lqcd of the QCD marker segment (FIG. 11) is rewritten to a value reduced by 3n (however, this rewriting is unnecessary for coded data subjected to a derived quantization; the value of Lqcd is rewritten to a value reduced by 6n for coded data subjected to an expounded quantization). An entry for last 3n bytes of SPqcd of the QCD marker segment is deleted (however, this deletion is unnecessary for coded data subjected to a derived quantization; an entry for 6n bytes is deleted for coded data subjected to an expounded quantization). When the COC marker segment (FIG. 10) exists, Lcoc and SPcoc thereof are rewritten in a similar manner to Lcod and SPcod of the COD marker segment. When the QCC marker segment (FIG. 12) exists, Lqcc and SPqcc thereof are rewritten in a similar manner to Lqcd and SPqcd of the QCD marker segment.

Upon synthesizing the coded data after the post-quantization performed as above in resolution-level units with coded data composed of all or a part of the codes abandoned by the post-quantization, the marker segments are rewritten in manners contrary to the post-quantization.

In a case of the CPRL progression, handling of packets is performed according to the following order:

```
for (component) {
    for (precinct) {
        for (resolution level) {
            for (layer) {
                arrange packets: upon coding
                interpret packets: upon decoding
            }
        }
    }
}
```

In a post-quantization reducing the number of components of coded data of the CPRL progression by n, packets of an unnecessary component are abandoned, a value of Lsiz of the SIZ marker segment (FIG. 8) is rewritten to a value reduced by 3n, and a value of Csiz is rewritten to a value reduced by n. Besides, entries for last n components of Ssiz, XRsiz, and YRsiz of the SIZ marker segment are deleted. Besides, when a byte of color conversion of SGcod of the COD marker segment (FIG. 9) is "1", the byte is rewritten to "0". JPEG2000 comprises a specification in which color conversion is applied only to first three components; thus, for example, when the first three components among four components remain, the byte of color conversion of SGcod may be kept "1".

Upon synthesizing the coded data after the post-quantization performed as above in component units with coded data composed of all or a part of the codes abandoned by the post-quantization, the marker segments are rewritten in manners contrary to the post-quantization.

Aside from the FOR loops of the progression orders described above, there is a loop regarding tiles. Although JPEG2000 does not prescribe as a standard, a decoder usually uses a structure as follows:

```
while (as long as tile exists) {
    for (resolution level) {
        for (layer) {
            for (component) {
                for (precinct) {
                    interpret packets
                }
            }
        }
    }
}
```

This example is the RLCP progression, which is similarly applicable to other progression orders.

In a post-quantization reducing the number of tiles of coded data of any progression order by n, packets of unnecessary n tiles are abandoned, values of Xsiz and Ysiz of the SIZ marker segment are rewritten to values equivalent to an image size reduced by the reduction of the number of tiles.

Besides, when reallocation of numbers to remaining tiles is required, Isot of the SOT marker segment (FIG. 7) is rewritten. Upon synthesizing the coded data after the post-quantization performed as above in tile units with coded data composed of all or a part of the codes abandoned by the post-quantization, the marker segments are rewritten in manners contrary to the post-quantization.

In addition, with respect to coded data of any progression order, it is possible to perform a post-quantization combining two elements or more among "layer (image quality)", "resolution level", "component", and "tile (area)", and also to perform a process contrary thereto, i.e., a synthesis of coded data.

Besides, as for a dynamic image of Motion-JPEG2000, each frame is compressed/coded independently from preceding and following frames; therefore, it is possible to perform a similar post-quantization and a similar synthesis with respect to coded data of each frame; it is also possible to cull any frame from a stream of frames, and additionally insert the culled frame into the frames.

Hereinafter, a description will be given of embodiments of an image browsing device and an image browsing and saving method according to the present invention.

Figure 16:
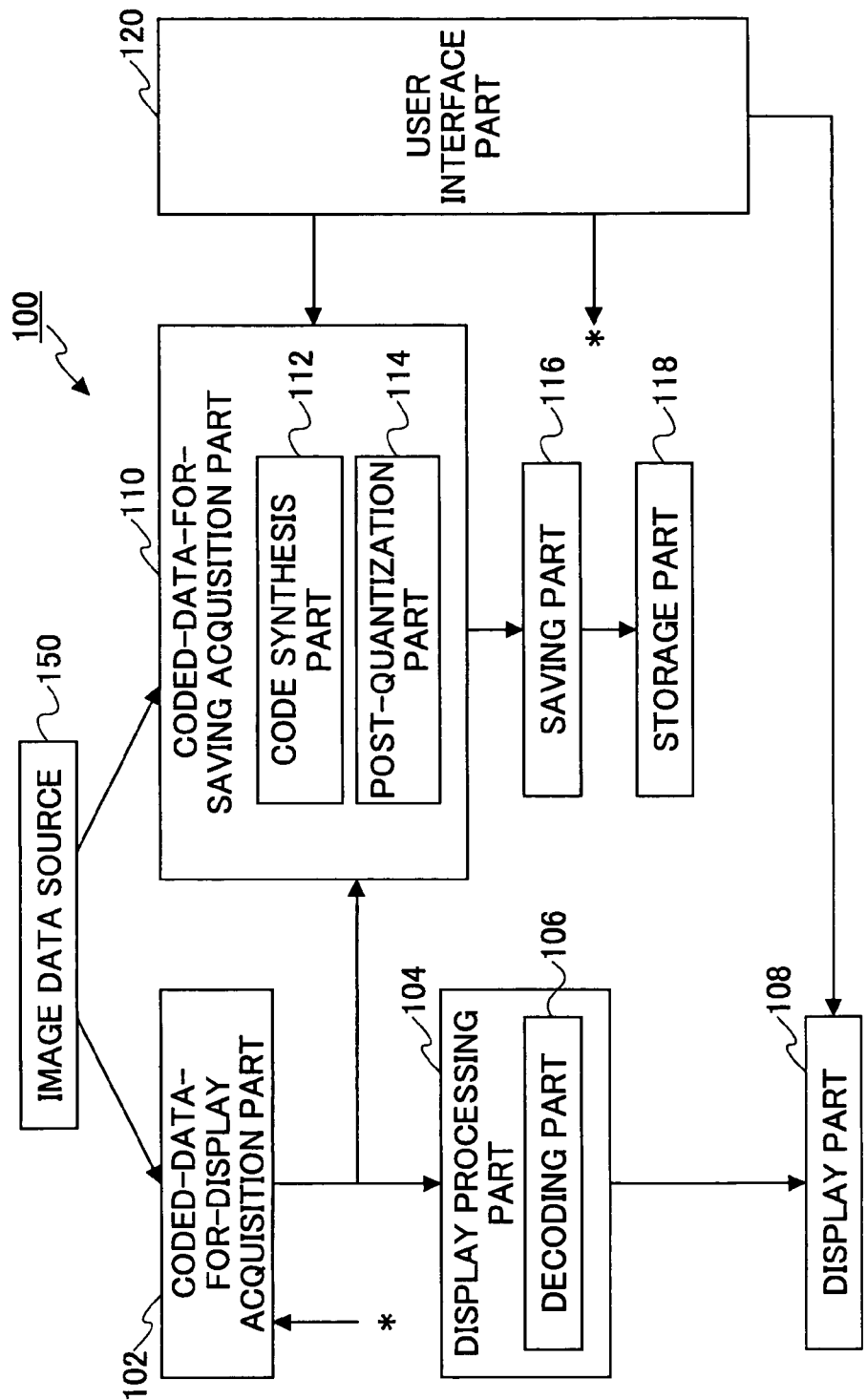
FIG. 16 is a block diagram for illustrating a functional structure of an image browsing device according to the present invention.
Figure 17:
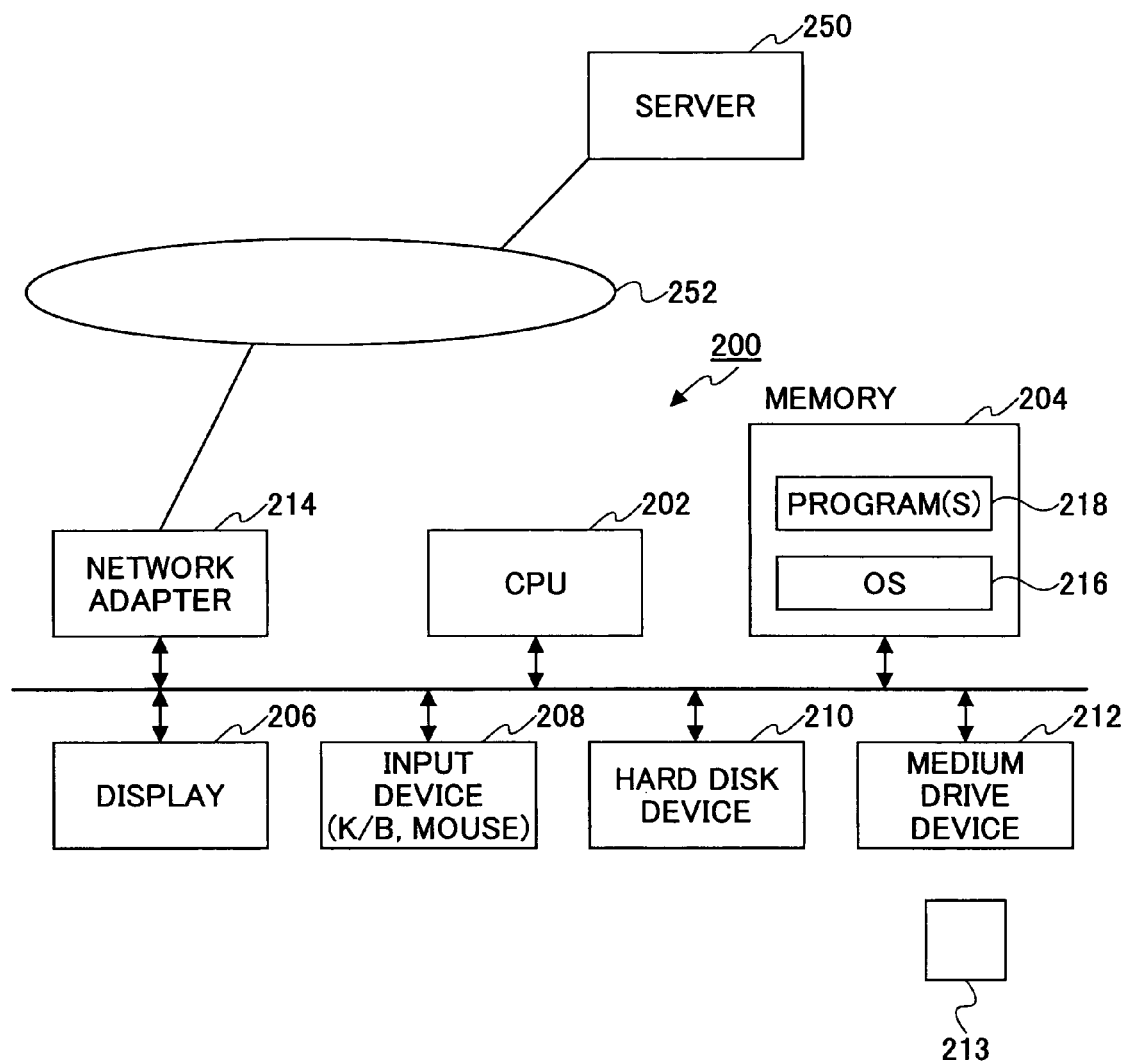
FIG. 17 is a block diagram for illustrating an example in which the image browsing device according to the present invention is realized by using a computer.

FIG. 16 is a block diagram for illustrating a functional structure of the image browsing device according to the present invention. FIG. 17 is a block diagram for illustrating an example in which the image browsing device according to one embodiment of the present invention is realized by using a computer, such as a personal computer.

An image browsing device 100 shown in FIG. 16 has functions of browsing an image stored in an external image data source 150, and of saving a desired image amongst the browsed images. As shown in FIG. 16, the image browsing device 100 comprises a coded-data-for-display acquisition unit 102, a display processing unit 104, a coded-data-for-saving acquisition unit 110, a saving unit 116, a user interface unit 120, a display unit 108, and a storage unit 118.

The coded-data-for-display acquisition unit 102 is a unit for acquiring coded data used for display of an image to be browsed from the image data source 150. The display processing unit 104 is a unit for decoding/extending the acquired coded data used for display by a decoding unit 106 conforming to JPEG2000, and displaying the image on the display unit 108.

The user interface unit 120 is a unit for providing a user interface for a user to input an instruction for saving an image displayed on the display unit 108, or information specifying an image quality, a resolution and so forth of the image to be saved, to the coded-data-for-saving acquisition unit 110, and to specify an image to be browsed to the coded-data-for-display acquisition unit 102. The user interface unit 120 presents a menu for the user by using the display unit 108; however, the user interface unit 120 may be arranged to present the menu by using a display unit independent from the display unit 108.

The coded-data-for-saving acquisition unit 110 is a unit for acquiring coded data for saving of an image to be saved as instructed by the user, with the image quality, the resolution and so forth specified by the user from the image data source 150. When an amount of codes of the coded data for saving is larger than the coded data for display, the coded data for saving as a whole may be acquired from the image data source 150, which is also within the scope of the present invention. However, in this case, for shortening a transmission time of the coded data from the image database 150, it is advantageous to additionally acquire only coded data equivalent to a difference between the coded data for saving and the already acquired coded data for display from the image data source 150, and synthesize the additionally acquired coded data with the already acquired coded data for display, thereby obtaining the coded data for saving. The coded-data-for-saving acquisition unit 110 comprises a code synthesis unit 112 for performing such synthesis. On the other hand, when all of the coded data for saving to be acquired is included in the already acquired coded data for display, the coded-data-for-saving acquisition unit 110 performs a post-quantization abandoning extra codes from the already acquired coded data for display by a post-quantization unit 114, thereby obtaining the necessary coded data for saving. Besides, processes performed by the code synthesis unit 112 include additional insertion of a frame of a dynamic image. Processes performed by the post-quantization unit 114 include culling of a frame of a dynamic image.

The saving unit 116 is a unit for storing the coded data for saving acquired by the coded-data-for-saving acquisition unit 110 in the storage unit 118 as an image file. Coded data of a static image is saved as an image file conforming to a file format of JPEG2000, and coded data of a dynamic image is saved as an image file conforming to a file format of Motion-JPEG2000 (the file formats, for example as disclosed in the nonpatent document 1).

Each of the units described above can be realized by hardware or firmware, and also can be realized by using a general-purpose computer, such as a personal computer. A description will be given, with reference to FIG. 17, of an example of realizing the units using a general-purpose computer, such as a personal computer.

As shown in FIG. 17, a general-purpose computer 200, such as a personal computer, has a general structure comprising a CPU 202, a memory 204, a display 206, an input device 208 (a pointing device, such as a keyboard (K/B) or a mouse), a hard disk device 210, a medium drive device 212 performing reading and writing from/to a recording (storage) medium 213 (a flexible magnetic disk, an optical disc, a magneto-optical disc, various memory cards, etc.), and a network adapter 214 for communicating with an external device via a network 252 (LAN, the Internet, etc.).

Necessary modules of an operating system (OS) 216, such as Microsoft Windows (registered trademark), are loaded to the memory 204 from the hard disk device 210. Program(s) 218 operating on this operating system 216 for realizing functions of each of the units shown in FIG. 16, i.e., procedural steps of the hereinbelow-described image browsing and saving method, by using the CPU 202 and other hardware, are also loaded to the memory 204, and are executed by the CPU 202.

The display 206 is used as the display unit 108 shown in FIG. 16. The hard disk device 210 or the medium drive device 212 is used as the storage unit 118 shown in FIG. 16.

Besides, various types of recording (storage) media on which the program(s) 218 are recorded are also included in the present invention.

In FIG. 17, a server 250 on the network 252 is equivalent to the image data source 150 shown in FIG. 16. Although one server 250 is shown in this example, a plurality of servers may exist. This server 250 may be basically the same as a common WWW server and so forth, but has a function to transmit coded data used for display of a stored image, and transmit coded data equivalent to a difference between coded data for saving and the coded data for display. Hereinafter, a description will be given of a more specific example of a structure the server 250.

The server 250 stores lossless-compressed coded data (or coded data lossy-compressed with a nearly lossless, low compression ratio) of a browsable image.

Upon receiving a request for browsing an image, the server 250 performs a post-quantization in a unit or units of "layer", "resolution level", "component" and "tile" to coded data of the image so as to create coded data having a small amount of codes, and transmits the created coded data as coded data used for display. Also, the server 250 creates coded data used for display by performing a similar post-quantization with respect to each frame of a dynamic image. As for a dynamic image, the server 250 can further perform an abandonment of codes in frame units, i.e., a culling of a frame.

Upon receiving a request for coded data for saving with respect to an image of which coded data used for display has been transmitted, the server 250 creates coded data (coded data equivalent to a difference between the coded data for saving and the coded data used for display) by abandoning codes of the coded data used for display from coded data post-quantized according to an image quality, a resolution and so forth specified from the requester (stored coded data per se when a post-quantization is unnecessary), and transmits the created coded data. Similarly, the server 250 creates and transmits such coded data, with respect to each frame of a dynamic image. Further, with respect to a dynamic image subjected to a culling of frames upon browsing, coded data for saving corresponding to all or a part of the culled frames is created and transmitted according to a number of frames specified from the requester.

Additionally, the server 250 may store coded data used for display of an image apart from lossless (or nearly lossless) coded data, which is also within the scope of the present invention. Besides, not the coded data equivalent to the difference between the coded data for saving and the coded data used for display, but the coded data for saving as a whole may be transmitted, which is also within the scope of the present invention. However, transmitting the coded data equivalent to the difference is advantageous in shortening a transmission time of the coded data.

A description will be given of an operation of the above-described image browsing device 100. FIG. 18 is a flowchart for illustrating the operation.

The coded-data-for-display acquisition unit 102 transmits a request for browsing an image to the image data source 150, and receives coded data used for display of the image (a static image or a dynamic image) transmitted from the image data source 150. The display processing unit 104 decodes/extends the received coded data used for display by the decoding unit 106 so as to reproduce image data, and displays the image data on the display unit 108. In the structure shown in FIG. 17, in steps according to the program 218, coded data used for display is received from the server 250 on the network 252 via the network adapter 214, and an image thereof is displayed on the display 206 (step S100).

According to one manner, in step S100, the coded-data-for-display acquisition unit 102 receives a hypertext described by HTML etc. that specifies a file name or a URL of the image from the image data source 150 (the server 250). Next, according to the file name or the URL specified in this hypertext, the coded-data-for-display acquisition unit 102 receives the coded data used for display of the image from the image data source 150 (the server 250). Then, the display processing unit 104 creates a page on which the image is pasted, and displays the page on the display unit 108.

According to this manner, the number of layers, the number of resolution levels, the number of components, the number of tiles, and the number of frames of a dynamic image, of coded data used for display of an image can be specified by the image data source 150 (the server 250) which stores the image.

Besides, in another manner, upon a request for browsing an image, the image data source 150 (the server 250) may be notified of information including the number of layers, the number of resolution levels, the number of components, the number of tiles, and the number of frames of a dynamic image, which are preset as default by a user, and coded data used for display according to the information may be received from the image database 150 (the server 250). This manner for controlling an amount of codes of coded data used for display and so forth at the user's part is also included in the present invention.

A user can direct a saving of the image displayed on the display unit 108 via the user interface unit 120 (step S102). For example, in the structure shown in FIG. 17, the user directs the saving of the image by operating the mouse of the input device 208, moving a mouse pointer to the image desired to be saved, clicking a right button of the mouse to display a context menu, putting the mouse pointer on an item of "save as (save under a new file name)" in the menu, and clicking a left button of the mouse.

The user interface unit 120 displays a menu for the user to specify with what image quality, resolution and so forth to save the image directed to be saved, and the user specifies the image quality, the resolution and so forth on the menu. The above-mentioned direction (instruction) for saving the image and information specifying the image quality, the resolution and so forth are passed from the user interface unit 120 to the coded-data-for-saving acquisition unit 110 (step S104).

In one manner, the user interface unit 120 displays a menu 300 containing a plurality of items for each of elements of "image quality", "resolution", "component", "area" and "frame" as shown in FIG. 19. The user can specify the image quality, the resolution and so forth by selecting one or more desired items on this menu 300. For example, the user can specify the image quality, the resolution and so forth by operating the mouse of the input device 208, putting the mouse pointer on a radio button (each of circular marks shown in FIG. 19) of a required item, and clicking the left button of the mouse. In the example shown in FIG. 19, "highest image quality", "highest resolution", "present component", "center only" and "all frames" are specified. The user directs an end of this specifying operation, for example, by putting a mouse cursor on "END OF SPECIFICATION" on the menu 300 and clicking the left button, or by pressing a return key of the keyboard of the input device 208.

Besides, on the menu 300 shown in FIG. 19, the user can specify the five elements, and does not necessarily have to specify all of the five elements. For example, when the menu 300 is initially displayed, the radio buttons of "present xxx" of all of the elements may be checked by default, and the user may specify only an element or elements required to be changed. In another example, when the menu 300 is initially displayed, the radio buttons of "highest image quality" and "highest resolution" may be checked by default, which maximizes an amount of codes of coded data for saving.

Figure 20:
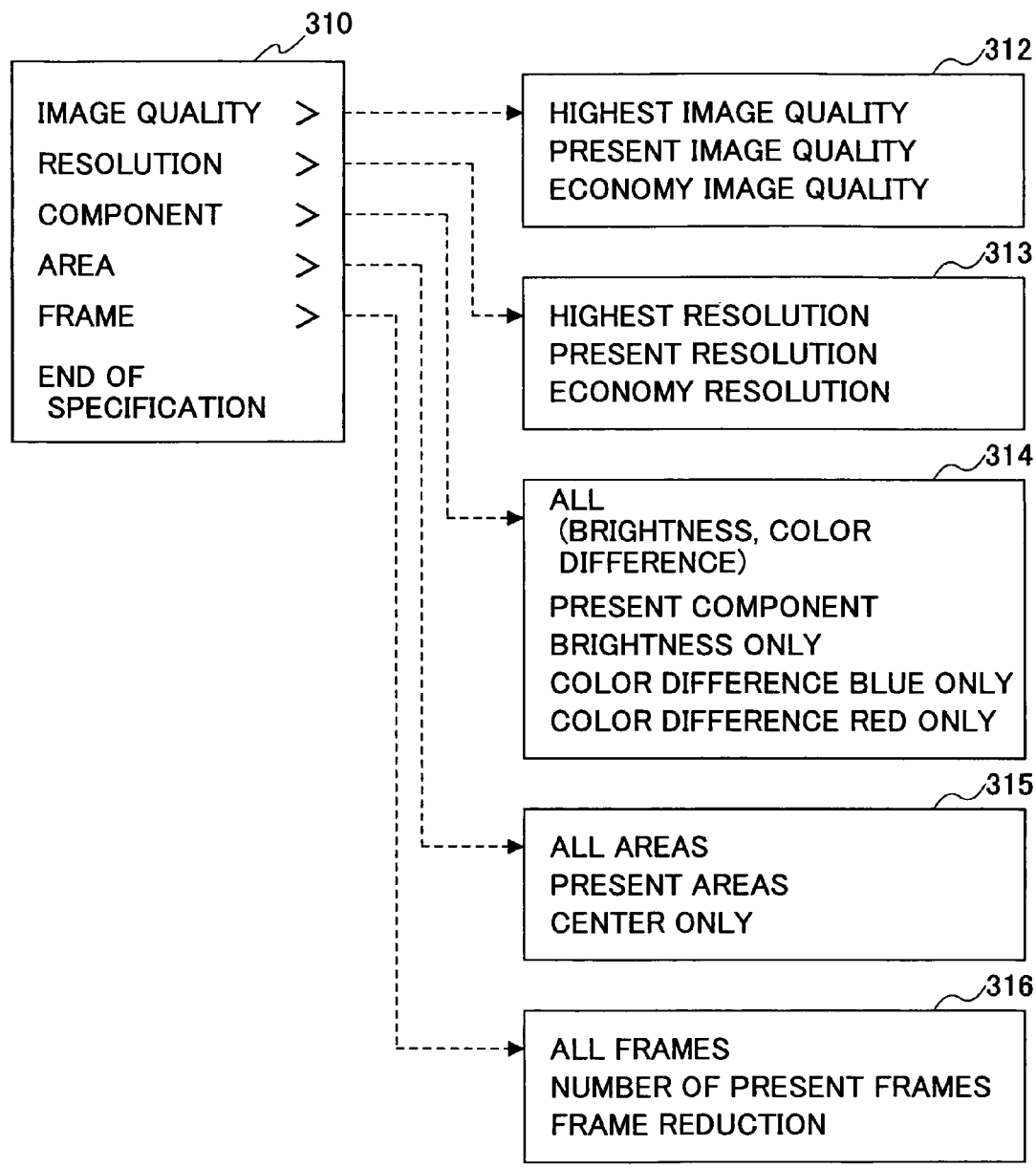
FIG. 20 is a diagram showing another example of a menu for specifying an image quality, a resolution and so forth.

In another manner, when the saving of the image is directed, the user interface unit 120 displays a menu 310 for the user to select either of the elements of "image quality", "resolution", "component", "area" and "frame" as shown in FIG. 20. When the user selects either of the elements on the menu 310, the user interface unit 120 displays one of sub-menus 312 to 316, which corresponds to the selected element in addition to the menu 310, and the user can specify a desired item on the sub menu. For example, the user can specify the item by operating the mouse of the input device 208, putting the mouse pointer on the desired element on the menu 310 so that one of the submenus 312 to 316 which corresponds to the element is displayed, putting the mouse pointer on the desired item on the sub menu, and clicking the left button of the mouse.

In this manner, the user can also specify each of the elements of "image quality", "resolution", "component", "area" and "frame" by repeating a procedure of causing the sub menu of one element to be displayed and selecting one item therefrom, and thereafter causing the sub menu of another element to be displayed and selecting one item therefrom.

Figure 21:
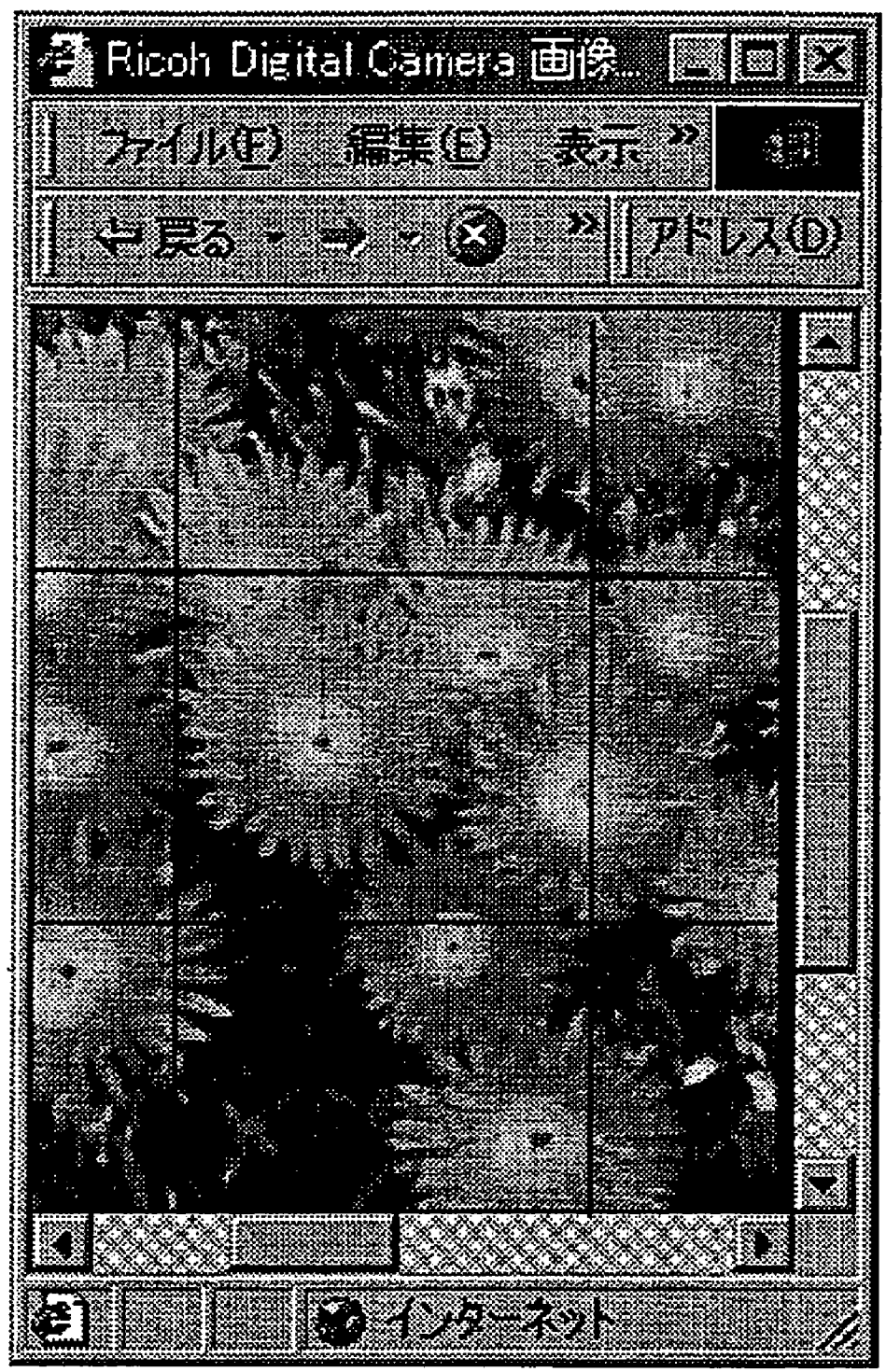
FIG. 21 is an illustration showing an example in which boundary lines of divided areas of an image are overlapped on the displayed image.

When "AREA" on the menu 310 is selected, boundary lines of divided areas (tiles) of an image are overlapped on the displayed image as illustrated in FIG. 21. Accordingly, the user can grasp how the image is divided, and can specify the element of "area" with ease.

The user directs an end of the specifying operation, for example, by putting the mouse cursor on "END OF SPECIFICATION" on the menu 310 and clicking the left button, or by pressing the return key of the keyboard of the input device 208. Regarding elements not specified by the user, it is assumed that the item of "present xxx" is specified for each of the unspecified elements, for example Besides, in one example, an item of "area division display" may be prepared in the context menu containing the item of "save as (save under a new file name)", and when the user selects the item of "area division display", the boundary lines of the divided areas (tiles) may be overlapped on the displayed image. Additionally, in another example, when the item of "save as (save under a new file name)" is selected, the boundary lines of the divided areas may be overlapped on the displayed image without waiting for an instruction from the user. These examples are also within the scope of the present invention.

According to the above-mentioned specification information input from the user interface unit 120, the coded-data-for-saving acquisition unit 110 determines a procedure for acquiring coded data for saving (step S106).

Specifically, when the coded-data-for-saving acquisition unit 110 judges that an additional acquisition of codes is necessary, such as when the item of "highest image quality" of the element of "image quality" is specified for the coded data used for display not having the highest image quality, when the item of "highest resolution" of the element of "resolution" is specified for the coded data used for display not having the highest resolution, when the item of "all (brightness, color difference)" of the element of "component" is specified for the coded data used for display not containing color-difference codes, or when the item of "all frames" of the element of "frame" is specified for the coded data used for display of a dynamic image from which frames have been culled, the coded-data-for-saving acquisition unit 110 requests the image data source 150 (the server 250) to transmit coded data equivalent to a difference between the coded data for saving and the coded data used for display, and receives the coded data equivalent to the difference (step S108). Then, the coded-data-for-saving acquisition unit 110 performs a synthesis (including additional insertion of frames of a dynamic image) of the received coded data with the coded data used for display by the code synthesis unit 112 so as to create the coded data for saving, and passes the coded data for saving to the saving unit 116 (step S110). Besides, as mentioned above, the required coded data for saving as a whole may be acquired from the image data source 150, which is also within the scope of the present invention.

When the coded-data-for-saving acquisition unit 110 judges that all codes of the coded data for saving are included in the coded data used for display, and that no extra codes are included in the coded data used for display, the coded-data-for-saving acquisition unit 110 passes the coded data used for display as the coded data for saving to the saving unit 116 (step S112). However, when the coded-data-for-saving acquisition unit 110 judges that extra codes are included in the coded data used for display, the coded-data-for-saving acquisition unit 110 performs a post-quantization (including abandonment of unnecessary frames of a dynamic image) for abandoning the extra codes from the coded data used for display by the post-quantization unit 114 so as to create the coded data for saving, and passes the coded data for saving to the saving unit 116 (step S114).

The saving unit 116 saves the coded data for saving passed from the coded-data-for-saving acquisition unit 110 in the storage unit 118 (the hard disk device 210 or the recording (storage) medium 213 shown in FIG. 17) as an image file in a file format (static image) of JPEG2000 or a file format (dynamic image) of Motion-JPEG2000 (step S116).

Besides, step S102 to step S116 shown in FIG. 18 may be repeated so as to save a plurality of images. Also, returning to step S100, another image may be browsed, and be saved if necessary.

Here, a specific description will be given of relationship between a specified item regarding each of the elements and coded data for saving. For example, it is supposed that the lossless (or nearly lossless) coded data stored in the image data source 150 (the server 250) has the number of layers being 30, the number of resolution levels being 6 (the number of decomposition levels being 5), the number of components being 3 (Y, Cb, Cr), and the number of divided tiles being 7 (length)×9 (width).

When the item of "highest image quality" is specified regarding the element of "image quality", the number of layers of the coded data for saving is set to 30 (layers 0-29). When "present image quality" is specified, the number of layers of the coded data for saving is set to 12 (layers 0-11), for example, which is the same number as the coded data used for display. When "economy image quality" is specified, the number of layers of the coded data for saving is set to 8 (layers 0-7), for example. In this example, when the "highest image quality" is specified, coded data comprising codes of 18 lower-order layers (however, codes of not specified resolution levels, etc., are unnecessary) is to be additionally acquired.

When the item of "highest resolution" is specified regarding the element of "resolution", the number of resolution levels of the code data for saving is set to 6 (levels 0-5). When "present resolution" is specified, the number of resolution levels of the coded data for saving is set to 4 (levels 0-3), for example, which is the same number as the coded data used for display. When "economy resolution" is specified, the number of resolution levels of the coded data for saving is set to 2 (levels 0-1), for example. In this example, when the "present resolution" is specified, and the "highest image quality" is specified, coded data comprising codes of the 18 lower-order layers with the resolution levels 0-3 is to be additionally acquired.

When the item of "all (brightness, color difference)" is specified regarding the element of "component," components of the coded data for saving are made three components of brightness Y, color difference Cb and color difference Cr. When "present component" is specified, components of the coded data for saving are made to be the same as the coded data used for display. When "brightness only", "color difference blue only" or "color difference red only" is specified, the coded data for saving is made to have only one specified component.

When the item of "all areas" is specified regarding the element of "area", the coded data for saving is made to be coded data of all tiles (7×9). When "present areas" is specified, the coded data for saving is made to be coded data comprising codes of tiles of 5×7 except peripheral tiles, for example, which is the same as the coded data used for display. When "center only" is specified, the coded data for saving is made to be coded data comprising codes of central tiles of 3×5, for example.

When the item of "all frames" is specified regarding the element of "frame" of a dynamic image, the number of frames to be saved is made equal to a total number of frames. When "number of present frames" is specified, the number of frames to be saved is made equal to a number of displayed frames (e.g., half the total frames due to culling of odd frames). When "frame reduction" is specified, the number of frames to be saved is made equal to one third of the total number of frames in which two frames are culled every three frames.

The foregoing embodiments are described based on coded data of a static image according to JPEG2000 or coded data of a dynamic image according to Motion-JPEG2000; however, the present invention is similarly applicable to coded data of a static image which can undergo abandonment and synthesis of codes in a coded state, and to coded data of a dynamic image which can undergo abandonment and additional insertion of frames in a coded state, even though other compression methods are used.

The, present invention is not limited to the specifically disclosed embodiments, and variations and modifications may be made without departing from the scope of the present invention.

The present application is based on Japanese priority application No. 2002-334150 filed on Nov. 18, 2002, the entire contents of which are hereby incorporated by reference.

What is claimed is:

1. An image browsing device browsing an image stored in an image data source, the device comprising:
   a coded-data-for-display acquisition unit to acquire coded data used for display of the image from the image data source;
   a display processing unit to decode/extend the acquired coded data used for the display, and display the image on a display unit;
   a user interface unit to provide a user interface for a user to input a direction for saving the image displayed on the display unit;
   a coded-data-for-saving acquisition unit to acquire coded data for the saving of the image directed by the user from the image data source, wherein the coded-data-for-saving acquisition unit additionally acquires coded data equivalent to a difference between the coded data for the saving and the coded data used for the display from the image data source, and synthesizes the coded data for the saving from the additionally acquired coded data and the coded data used for the display; and
   a saving unit to save the acquired coded data for the saving in a storage unit.

2. The image browsing device as claimed in claim 1, wherein each of the coded data used for the display and the coded data for the saving is coded data conforming to JPEG2000.

3. An image browsing device browsing an image stored in an image data source, the device comprising:
   a coded-data-for-display acquisition unit to acquire coded data used for display of the image from the image data source;
   a display processing unit to decode/extend the acquired coded data used for the display, and display the image on a display unit;
   a user interface unit to provide a user interface for a user to input a direction for saving the image displayed on the display unit, wherein the user interface unit presents the user with a menu regarding at least one of elements of an image quality, a resolution, a number of components, an area and a number of frames of the image when the saving of the image displayed on the display unit is directed by the user, and supplies specification information corresponding to an item selected on the menu by the user;
   a coded-data-for-saving acquisition unit to acquire coded data for the saving of the image directed by the user from the image data source, wherein the coded-data-for-saving acquisition unit acquires the coded data for the saving according to the supplied specification; and
   a saving unit to save the acquired coded data for the saving in a storage unit.

4. The image browsing device as claimed in claim 3, wherein the user interface unit presents the user with boundary lines of divided areas of the image directed to be saved.

5. The image browsing device as claimed in claim 3, wherein the coded-data-for-saving acquisition unit acquires the coded data for the saving by abandoning extra code from the coded data used for the display when all of the coded data for the saving according to the supplied specification information is included in the coded data used for the display.

6. An image browsing device browsing an image stored in an image data source, the device comprising:
   a coded-data-for-display acquisition unit to acquire coded data used for display of the image from the image data source;
   a display processing unit to decode/extend the acquired coded data used for the display, and display the image on a display unit;
   a user interface unit to provide a user interface for a user to input a direction for saving the image displayed on the display unit, wherein the user interface unit presents a first menu for the user to select at least one of elements of an image quality, a resolution, a number of components, an area and a number of frames of the image when the saving of the image displayed on the display unit is directed by the user, presents a second menu regarding the selected element for the user when the user selects the element, and supplies specification information corresponding to the selected element and an item selected on the second menu by the user when the user selects the item;
   a coded-data-for-saving acquisition unit to acquire coded data for the saving of the image directed by the user from the image data source, wherein the coded-data-for-saving acquisition unit acquires the coded data for the saving according to the supplied specification information; and
   a saving unit to save the acquired coded data for the saving in a storage unit.

7. The image browsing device as claimed in claim 6, wherein the user interface unit presents the user with boundary lines of divided areas of the image directed to be saved when the element selected by the user is the area of the image.

8. The image browsing device as claimed in claim 6, wherein the coded-data-for-saving acquisition unit acquires the coded data for the saving by abandoning extra code from the coded data used for the display when all of the coded data for the saving according to the supplied specification information is included in the coded data used for the display.

9. An image browsing and saving method comprising:

acquiring coded data used for display of an image from an image data source;

performing one or both of decoding and extending the acquired coded data used for the display, and displaying the image on a display unit;

providing a user interface for a user to input a direction for saving the image displayed on the display unit;

acquiring coded data for the saving of the image directed by the user from the image data source, wherein acquiring coded data for saving comprises additionally acquiring coded data equivalent to a difference between the coded data for the saving and the coded data used for the display from the image data source, and synthesizing the coded data for the saving from the additionally acquired coded data and the coded data used for the display; and saving the acquired coded data for the saving in a storage unit.

10. An image browsing and saving method comprising:

acquiring coded data used for display of an image from an image data source;

performing one or both of decoding and extending the acquired coded data used for the display, and displaying the image on a display unit;

providing a user interface for a user to input a direction for saving the image displayed on the display unit;

acquiring coded data for the saving of the image directed by the user from the image data source;

saving the acquired coded data for the saving in a storage unit;

presenting the user with a menu regarding at least one of elements of an image quality, a resolution, a number of components, an area and a number of frames of the image when the direction for saving the image is input; and supplying specification information corresponding to an item selected on the menu by the user, wherein acquiring coded data for saving comprises acquiring the coded data for the saving according to the supplied specification information.

11. The image browsing and saving method as claimed in claim 10, further comprising presenting the user with boundary lines of divided areas of the image directed to be saved.

12. The image browsing and saving method as claimed in claim 10, wherein acquiring coded data for saving comprises abandoning extra code from the coded data used for the display when all of the coded data for the saving according to the supplied specification information is included in the coded data used for the display.

13. An image browsing and saving method comprising:

acquiring coded data used for display of an image from an image data source;

performing one or both of decoding and extending the acquired coded data used for the display, and displaying the image on a display unit;

providing a user interface for a user to input a direction for saving the image displayed on the display unit;

acquiring coded data for the saving of the image directed by the user from the image data source;

saving the acquired coded data for the saving in a storage unit;

presenting a first menu for the user to select at least one of elements of an image quality, a resolution, a number of components, an area and a number of frames of the image when the direction for saving the image is input;

presenting a second menu regarding the selected element for the user when the user selects the element from the first menu; and supplying specification information corresponding to the selected element and an item selected on the second menu by the user, wherein acquiring coded data for saving comprises acquiring the coded data for the saving according to the supplied specification information.

14. The image browsing and saving method as claimed in claim 13, further comprising presenting the user with boundary lines of divided areas of the image directed to be saved when the element selected from the first menu by the user is the area of the image.

15. The image browsing and saving method as claimed in claim 13, wherein acquiring coded data for saving comprises abandoning extra code from the coded data used for the display when all of the coded data for the saving according to the supplied specification information is included in the coded data used for the display.

16. An article of manufacture having one or more computer-readable media storing instructions thereon which, when executed by a computer, cause the computer to perform a method comprising:

acquiring coded data used for display of an image from an image data source;

performing one or both of decoding and extending the acquired coded data used for the display, and displaying the image on the display unit;

providing a user interface for a user to input a direction for saving the image displayed on the display unit;

acquiring coded data for the saving of the image directed by the user from the image data source;

saving the acquired coded data for the saving in a storage unit;

presenting the user with a menu regarding at least one of elements of an image quality, a resolution, a number of components, an area and a number of frames of the image when the saving of the image displayed on the display unit is directed by the user; and supplying the computer with specification information corresponding to an item selected on the menu by the user.

17. An article of manufacture having one or more computer-readable media storing instructions thereon which, when executed by a computer, cause the computer to perform a method comprising:

acquiring coded data used for display of an image from an image data source;

performing one or both of decoding and extending the acquired coded data used for the display, and displaying the image on the display unit;

providing a user interface for a user to input a direction for saving the image displayed on the display unit;

acquiring coded data for the saving of the image directed by the user from the image data source;

saving the acquired coded data for the saving in a storage unit;

presenting a first menu for the user to select at least one of elements of an image quality, a resolution, a number of components, an area and a number of frames of the image when the saving of the image displayed on the display unit is directed by the user;

presenting a second menu regarding the selected element for the user when the user selects the element; and supplying the computer with specification information corresponding to the selected element and an item selected on the second menu by the user when the user selects the item.

18. An article of manufacturing having one or more computer-readable media storing instructions thereon which, when executed by a computer, cause the computer to perform a method comprising:

acquiring coded data used for display of an image from an image data source;

decoding and extending the acquired coded data used for the display, and displaying the image on a display unit;

providing a user interface for a user to input a direction for saving the image displayed on the display unit;

acquiring coded data for the saving of the image directed by the user from the image data source, wherein acquiring coded data for saving comprises additionally acquiring coded data equivalent to a difference between the coded data for the saving and the coded data used for the display from the image data source, and synthesizing the coded data for the saving from the additionally acquired coded data and the coded data used for the display; and saving the acquired coded data for the saving in a storage unit.

* * * * *